United States Patent Office 3,172,741
Patented Mar. 9, 1965

3,172,741
SEPARATION OF GASES BY DIFFUSION
John Eric Jolley, Wilmington, Del., assignor to E. I. du Pont de Nemours and Company, Wilmington, Del., a corporation of Delaware
No Drawing. Filed Dec. 15, 1958, Ser. No. 780,247
4 Claims. (Cl. 55—16)

This invention relates to the recovery of light gases such as hydrogen and helium from mixtures of other gases. The gas mixtures may occur in nature or be produced industrially.

The invention comprises the steps of bringing a gas mixture containing at least two gases, one gas selected from the group consisting of hydrogen and helium and at least one other gas, into contact with one side of a thin, substantially non-porous membrane formed from a plastic film-forming polymeric material, the polymeric material comprising a polymer having at least one type of polar group with a dipole moment of at least 2.5 Debye units; causing a portion of the gas mixture to permeate through the membrane; and removing the permeated gas from the opposite side of the membrane.

The plastic film-forming polymeric material is preferably selected from the group consisting of polyacrylonitrile, polyethylene terephthalate, and polyamide such as polyhexamethylene adipamide. The films of polyethylene terephthalate and polyacrylonitrile should be biaxially elongated and heat treated. Biaxial elongation serves to improve the physical properties such as the strength, the toughness, etc. of the films. The heat treatment serves to impart dimensional stability and, in the case of polyacrylonitrile film, also serves to eliminate any voids that may be present in the film. It should be understood that the films for use in the present invention must be thin and essentially non-porous, i.e., free of pin holes, voids and other defects that destroy their continuity.

The most outstanding materials, as will be evident from the subsequent examples, are polyacrylonitrile and polyethylene terephthalate, particularly polyacrylonitrile, in the form of self-supporting films that have been biaxially elongated and heat treated. Biaxial elongation involves rolling or stretching the film to elongate it at least 2× in each of the usual two mutually perpendicular directions. The heat treatment, in general, comprises heating the oriented film to an elevated temperature and holding it under tension during subsequent cooling to room temperature. In the case of polyacrylonitrile, the film is heated to a temperature of 90°–110° C. and cooled under tension as described in U.S. application Serial No. 740,140, filed June 17, 1958, to K. R. Osborn, now abandoned. For polyethylene terephthalate, the film is heated to 150°–225° C. and cooled under tension.

The dipole moments [1] of typical polar groups falling within the definition of the polymers useful in the present invention follow:

| | Debyes |
|---|---|
| —C≡N | 3.8 |
| >C=O | 2.5 |

It should be understood that polymeric materials for use in the present invention need only contain one type of polar group with a dipole moment of at least 2.5 Debye units. Thus, polyamides which contain >C=O groups (2.5 Debyes) fall within the present invention irrespective of the dipole moment values of the >N—H groups contained therein.

In the following table, Table 1, available separation factors are presented for representative highly polar polymeric films of the present invention in separating binary gas mixtures containing hydrogen or helium as one of the components. For the sake of comparison, the separation factors for polystyrene and ethyl cellulose, which polymeric materials do not fit within the definition of the present invention, are also given. "Separation factor" is defined as the ratio of the permeability of helium or hydrogen to the permeability of the other component of the mixture.

TABLE 1

*Separation factors for various films*

| Gas Mixture | Polyacrylonitrile | Polyethylene Terephthalate | Polyvinyl Fluoride | Regenerated Cellulose | Polyhexamethyleneadipamide | Polystyrene | Ethyl Cellulose |
|---|---|---|---|---|---|---|---|
| He+CH₄ | 60,000 | 264 | 166 | 400 | 214 | 14.6 | 4.8 |
| H₂+CH₄ | 10,000 | 162 | 68.5 | | | 21.2 | 6.6 |
| He+N₂ | 3,750 | | | | | 16 | 10.8 |
| H₂+N₂ | 625 | | | | | 22 | 15 |
| He+O₂ | | 35.5 | 45 | 48 | 39 | 5.5 | 3.2 |
| He+H₂ | 6 | 1.6 | 2.4 | | | .73 | .73 |

The invention will be more clearly understood by referring to the following examples, Example I representing the best mode contemplated for performing the invention. These examples, although illustrating specific embodiments of the present invention, should not be considered to limit the scope of the present invention. Unless otherwise stated, all percentages in the examples are based on volume.

EXAMPLE I

A gas mixture composed of 98.25% methane and 1.75% helium at a temperature of 25° C. was passed to a first stage permeation unit similar to that described in American Society of Testing Materials Method D–1434–56T. The unit contained a plastic membrane of polyacrylonitrile, .0022″ thick.

The polyacrylonitrile film had been prepared by dispersing the acrylonitrile polymer in an aqueous metal salt solution, casting the dispersion into a film, air drying the cast dispersion to coalesce it, stretching the coalesced film 3× in biaxial directions, heating the film held under tension at 90°–100° C., and thereafter cooling under tension to produce a void-free film.

On one side of the permeation unit (the high pressure side), the pressure was maintained at 27 atmospheres. On the low pressure side, the pressure was less than one atmosphere.

The gas mixture passing through the membrane analyzed less than 1% methane and about 99% helium.

EXAMPLE II

The gax mixture of Example I, composed of 98.25% methane and 1.75% helium was passed to a permeation unit as in Example I, the unit containing a membrane of polyvinyl fluoride film .0018″ thick.

---

[1] Reported in "Textbook of Physical Chemistry," by Glasstone, 2nd ed., Von Nostrand, p. 552, and in "Structure of Molecules," by Serkin and Dyatkin, 1950, Butterworth Scientific Publications, chapter 10.

The polyvinyl fluoride film had been prepared by dispersing polyvinyl fluoride in a latent solvent and casting the dispersion into film, as described in U.S. application Serial No. 715,394, filed February 14, 1958 to L. R. Bartron, now Patent No. 2,953,818, stretching the film 3× in biaxial directions and heating and cooling the stretched film held under tension to yield a nonporous film.

The gas mixture passing through the membrane analyzed 19.5% methane and 80.5% helium.

EXAMPLE III

Example I was again repeated using a film of polyethylene terephthalate, .0015″ thick, in the permeation unit.

The polyethylene terephthalate film had been prepared as described in U.S. Patent No. 2,823,421 by casting molten polyethylene terephthalate onto a cool drum, stretching the cast film 3× in the longitudinal and transverse directions at 85°–90° C. and 95°–100° C., respectively, then heating the stretched film under tension at 150°–160° C., and thereafter cooling the film.

The gas mixture passing through the membrane analyzed 11% methane and 89% helium.

The process of the present invention contemplates the use of a polymeric film having a thickness of .01 to 10 mils. Some polymeric films may be used without support in the separation unit. However, it is preferred to employ a support such as a perforated solid disc or a woven screen for the thin film. It is also possible to use the polymeric materials as coatings on or laminates with fabrics, the fabrics being used as supports for the thin film coatings.

The process may be conducted at room temperature. However, temperatures as high as 150° C. may be used with the preferred polymeric films without interfering with the selective permeation of the films.

The selection of the pressure differential across the membrane during the separation process is not usually a difficult problem. The pressures used in the examples were 27 atmospheres on the upstream side of the film and less than one atmosphere on the downstream side. However, pressures of about 15 atmospheres on one side of the membrane to one atmosphere on the other side are usually adequate.

It should be understood that the pressure difference, the film thickness and the desired degree of separation can all be varied. However, there is a mutual dependence among these factors which is readily apparent. Certain limitations on the factors themselves are also apparent. Thus, the pressure used must not rupture the membrane. The thickness of the film must permit sufficiently high flow rates through the film for economical operation. The degree of separation is limited by the inherent separation factor of the polymeric material employed for the particular gas mixture involved.

It should also be understood that the number of stages used for separation will affect the determination of the optimum values for thickness, pressure and degree of separation. While only a single stage unit is shown in the examples, two or three or more stages are possible. The multiple stage unit is particularly useful for separating gas mixtures containing gases which do not differ very much in weight. Thus, hydrogen, helium or deuterium can be separated from many heavier gases such as methane, carbon dioxide, nitrogen, oxygen, ethylene, acetylene, etc. in a single stage unit. Using a multi-stage unit, helium can be separated from mixtures with hydrogen or deuterium; and carbon dioxide can be separated from mixtures with methane or nitrogen, etc.

It is understood that changes and variations may be made without departing from the spirit and scope of the invention as defined in the appended claims.

What is claimed is:

1. A process for separating gases which comprises a step of bringing a gas mixture containing one gas selected from the group consisting of hydrogen and helium and at least one other gas into contact with one side of a membrane formed from a film-forming polymeric material, the polymeric material comprising a polymer in which every repeating unit contains a group having a dipole moment of at least 2.5 Debye units, and selected from the group consisting of polyacrylonitrile and a polymer wherein every repeating unit contains the substituent =o pendant from a carbon atom which forms a part of the main chain of said polymer, permeating a portion of said gas mixture through the membrane, said portion having a greater concentration of said one gas than the original gas mixture; and removing the permeated gas from the opposite side of said membrane.

2. A process as in claim 1 wherein the membrane is polyethylene terephthalate.

3. A process as in claim 1 wherein the membrane is biaxially-elongated, heat-treated polyacrylonitrile.

4. A process as in claim 1 wherein the membrane is biaxially-elongated, heat-treated polyethylene terephthalate.

References Cited in the file of this patent

UNITED STATES PATENTS

| | | |
|---|---|---|
| 2,540,152 | Weller | Feb. 6, 1951 |
| 2,597,907 | Steiner et al. | May 27, 1952 |
| 3,019,853 | Kohman et al. | Feb. 6, 1962 |

OTHER REFERENCES

Dow Bulletin, "Saran Resin F–120," Coatings Technical Service, Dow Chemical Co., Plastics Dept., Midland, Mich., November 1954, p. 5.

Rec. Trav. chim. 57, 317–32 (1938) (in English) (see Chem. Abstracts, vol. 32, 4778).

"Separation of Gases by Plastic Membranes," by D. W. Brubaker and K. Kammermeyer, Industrial and Engineering Chemistry, vol. 46, Apr. 1, 1954, pp. 733–739.